April 26, 1932.  A. E. PREYER  1,855,560
CORD TIRE STRUCTURE
Filed March 21, 1929
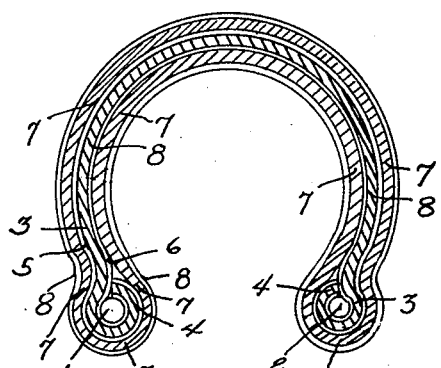
— FIG-1 —
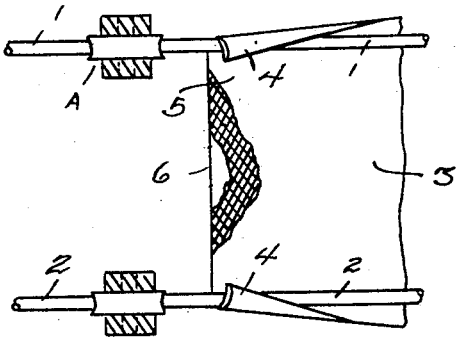
— FIG-2 —
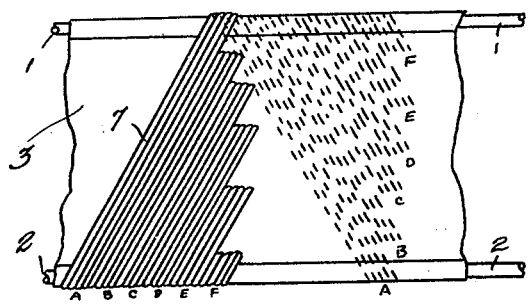
— FIG-3A —
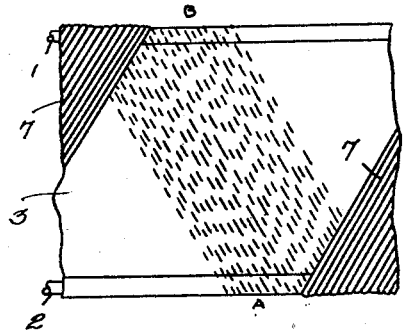
— FIG-3B —
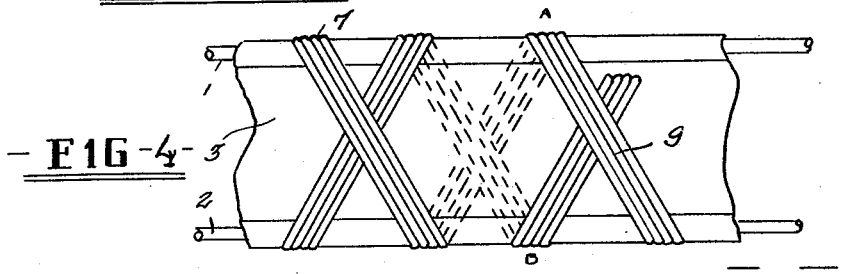
— FIG-4 —
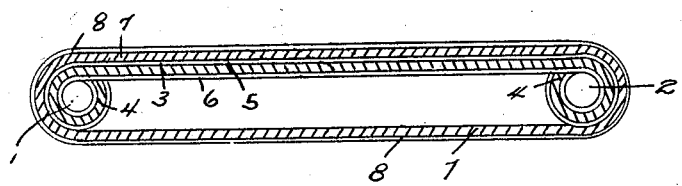
— FIG-5 —
Inventor
ARTHUR E. PREYER,
By Wm. I. Leubkerlus
Attorney Patented Apr. 26, 1932

1,855,560

UNITED STATES PATENT OFFICE

ARTHUR E. PREYER, OF WASHINGTON, DISTRICT OF COLUMBIA

CORD TIRE STRUCTURE

Original application filed August 17, 1928, Serial No. 225,686. Divided and this application filed March 21, 1929. Serial No. 348,872.

My present invention, in its broad aspect, has reference to improvements in so-called "cord" tire structures, the carcasses of which I have greatly improved, and produced at relatively less cost than heretofore as described in my co-pending application for patent upon the method, filed August 17th, 1928, Serial #225,686, of which the present application is a division. It is the practice in the art to first build up the web or cord-and-fabric body, and then build into it the bead portions; and thereafter mold and cure the structure of the tire thereabouts. Others have found it expedient to incorporate the beads directly within the cord-and-fabric body during its formation. However, considerable difficulty has been experienced and much effort has been expended in producing a web or cord-and-fabric body wherein the beads are embedded, and wherein the ends of the cords cannot unravel and wherein the cords and underlying base are adapted to withstand the many different stresses and strains to which a tire is subjected, and wherein the laminations of cord, rubber and fabric are formed into a cohesive, unitary structure under uniform tension. Still other methods with which I am acquainted propose to develop a cord-and-fabric body upon a platen or the like using a liner thereon for positioning the fabric during the operation of winding the cord thereabouts. Still others develop the structure on a ring, and many propose complicated methods wholly unadapted to commercial production, such as making a tube on a mandrel and afterwards inserting the bead forming material. My present cord-tire structure does not need in its formation a platen, guide or a liner as a conveyor, since the bead elements sustain the structure, i. e. the cord structure, as it is built up directly upon a body formed of any suitable material, such as fabric, cord or rubber, or the like and carried directly by the bead elements; said body having its edge portions turned about the beads to be carried thereby to completely enclose the same. Furthermore my carcass can be produced with any desired number of layers, and the cords are so applied as to eliminate free ends which are likely to become unraveled, and cut cord ends at or near the beads. As a base for my carcass I use a flat strip of any suitable pliable material, such as fabric, cord, or rubber sheeting, which is impregnated or treated top and bottom with unvulcanized rubber. The edges of the strip are turned about the beads to completely enclose the same, and about the whole is continuously wound the cord which is laid at any desired angle, preferably from 30° to 55°. The cording may first be covered or impregnated with rubber, gum, or a thin sheet of unvulcanized rubber may be inserted above and below the cord structure. The body so formed is pressed into a cohesive mass, and the ends of the beads joined to form a ring which is then given the shape of the tire and is then adapted to receive thereon the material forming the body of the tire, and the lining, walls, bead toes, breaker strips and tread; it is now ready to be cured in the maner well known in the art. My structure is characterized by a high degree of cohesiveness, durability to withstand strain imposed from any angle, efficiency, and the ease with which the cord structure may be manufactured in quantities.

Other and equally important objects and advantages will become apparent as the description of my invention proceeds, but while I have in the present instance defined for the sake of illustration an article of a certain specific form, it will be understood that I do not desire to limit myself thereby except as may be indicated by the scope of the claims appended hereto and forming a part of this specification.

In the drawings wherein is illustrated an embodiment of my invention;—

Figure 1 is a section through my cord tire structure, and shows the relative positions of the fabric, rubber and cord layers.

Figure 2 is a diagrammatic view of the manner of applying the bead.

In Figure 3, the two views A and B designate respectively the manner of applying a single ply cord body, the separate wraps of the cord being designated A, B, C, D, E, and F, and the manner of applying the respective free ends of the single wrap, two ply cord body, to the end that unraveling will be prevented; in these views A and B designate the respective ends.

Figure 4 is a detail view of the manner of applying the double wrap, four ply cord body, A and B designating the respective plys, and Figure 5 is a transverse section taken through the structure and shows the disposition of the laminations thereof.

In the drawings like characters of reference are used to designate like or similar parts throughout the several views.

The numerals (1) and (2) designate bead elements which are carried and supported by grooved rollers during the process of manufacture of my carcass as described in my copending application hereinbefore referred to. The base (3) is a flat strip of any suitable pliable material, such for instance as fabric, cord, unvulcanized rubber sheeting or the like, here described as fabric for the purpose of this description of my invention. The base (3) is disposed with its edges (4) turned about the bead elements (1) and (2) to completely enclose the same after the manner of a pocket and both the top and bottom thereof is covered with unvulcanized rubber as at (5) and (6), or if desired the fabric, or base material, may be impregnated with rubber. The cord body (7) is applied on the base and about the beads carried by the base, by continuously winding the strands thereof about the base at an angle of from 30 to 55 degrees, and the cord body may be either first covered with unvulcanized rubber as at (8), or a sheet of unvulcanized rubber may be laid above and below it. The several wraps A, B, C, D, E and F forming the single wrap, two ply cord body are shown in Figure 3, and the free ends A and B are smoothed down to prevent unraveling. When it is desired to produce a double wrap, four ply cord body, the top layer of cords is wound at an angle reverse to the lower layer as shown at (9) in Figure 4, the two wraps being designated A and B. Any number of layers or plys of cord may be applied in a similar manner.

The competed structure is now pressed into a cohesive mass and formed into a ring and the ends of the bead elements joined and the cord ends smoothed out. The structure is now ready to receive the material of the body of the tire, which is applied in a manner well known in the art.

While in the foregoing there has been illustrated in the drawings and described in the specification such combination and arrangement of elements as constitute the preferred embodiments of my invention, it is nevertheless desired to emphasize the fact that interpretation of my invention should only be conclusive when made in the light of the subjoined claims.

I claim:—

1. A cord tire structure comprising bead elements, a fabric base having its edges turned to extend completely about said bead elements to wholly cover and retain the same after the manner of a pocket, said fabric base being treated with rubber top and bottom, and a rubber treated cord covering wound at an angle about both said base and bead elements for the purpose defined.

2. A cord tire structure comprising bead elements, a fabric base having its edges turned about said bead elements, to completely cover and retain the same after the manner of a pocket, said fabric base being treated with rubber, and a rubber treated cord covering wound at an angle about both said base and said bead elements, the ends of the stands of said cord covering being smoothed down on the body thereof at a point removed from the beads.

3. A tire structure comprising bead members, a base element having the edges thereof turned to extend completely about said bead members to pocket the same and form an enclosing and supporting wrapper completely encasing said bead members, a cord covering enclosing both said base element and said bead members, said covering comprising cord windings disposed at a bias with respect to said base element and bead members, and a cohesive material between the base element and cord covering and on the cord covering.

4. A tire structure comprising bead members, a fabric base element having the edges thereof turned to extend completely about and wholly enclosing said bead members to retain and support the latter, a cord covering for both the base element and bead members, said covering comprising cord windings disposed at a bias with respect to said fabric base element, and a cohesive rubber binder between said fabric base element and cord covering and on said cord covering.

In testimony whereof I affix my signature hereunto.

ARTHUR E. PREYER.